United States Patent
Kaufmann et al.

(10) Patent No.: US 11,030,515 B2
(45) Date of Patent: Jun. 8, 2021

(54) DETERMINING SEMANTICALLY DIVERSE RESPONSES FOR PROVIDING AS SUGGESTIONS FOR INCLUSION IN ELECTRONIC COMMUNICATIONS

(71) Applicant: Google Inc., Mountain View, CA (US)

(72) Inventors: Tobias Kaufmann, Zurich (CH); Anjuli Kannan, Berkeley, CA (US)

(73) Assignee: GOOGLE LLC, Mountain View, CA (US)

( * ) Notice: Subject to any disclaimer, the term of this patent is extended or adjusted under 35 U.S.C. 154(b) by 1163 days.

(21) Appl. No.: 15/394,869

(22) Filed: Dec. 30, 2016

(65) Prior Publication Data
US 2018/0189628 A1    Jul. 5, 2018

(51) Int. Cl.
| | |
|---|---|
| *G06N 3/04* | (2006.01) |
| *G06N 3/00* | (2006.01) |
| *G06F 40/30* | (2020.01) |
| *G06F 40/56* | (2020.01) |
| *H04L 12/58* | (2006.01) |

(52) U.S. Cl.
CPC ............. *G06N 3/006* (2013.01); *G06F 40/30* (2020.01); *G06F 40/56* (2020.01); *G06N 3/04* (2013.01); *G06N 3/0445* (2013.01); *H04L 51/02* (2013.01); *H04L 51/36* (2013.01)

(58) Field of Classification Search
CPC ........ G06N 3/006; G06N 3/04; G06N 3/0445; G06F 40/56; G06F 40/30
See application file for complete search history.

(56) References Cited

U.S. PATENT DOCUMENTS

| | | |
|---|---|---|
| 6,278,996 B1 | 8/2001 | Richardson et al. |
| 2005/0192992 A1 | 9/2005 | Reed et al. |
| 2013/0144890 A1 | 6/2013 | Liu |
| 2015/0363696 A1 | 12/2015 | Konya et al. |

(Continued)

FOREIGN PATENT DOCUMENTS

| | | |
|---|---|---|
| JP | 2014134903 | 7/2014 |
| KR | 20140016785 | 2/2014 |
| KR | 20160016532 | 2/2016 |

OTHER PUBLICATIONS

Kanna, Anjuli, Kurach Karol et al., "Smart Reply: Automated Response Suggestion for Email", KDD '16, Aug. 13-17, 2016. (Year: 2016).*

(Continued)

*Primary Examiner* — Kamran Afshar
*Assistant Examiner* — Ying Yu Chen
(74) *Attorney, Agent, or Firm* — Middleton Reutlinger

(57) ABSTRACT

Methods and apparatus related to determining a semantically diverse subset of candidate responses to provide for initial presentation to a user as suggestions for inclusion in a reply to an electronic communication. Some of those implementations determine the semantically diverse subset of candidate responses based on generating, over a neural network response encoder model, embeddings that are each based on one of the plurality of candidate responses. The embedding based on a given candidate response may be compared to embedding(s) of candidate response(s) already selected for the subset, and the given candidate response added to the subset only if the comparing indicates a difference criterion is satisfied.

16 Claims, 6 Drawing Sheets

(56) References Cited

U.S. PATENT DOCUMENTS

| | | | |
|---|---|---|---|
| 2016/0241493 A1 | 8/2016 | Sharp et al. | |
| 2016/0306800 A1 | 10/2016 | Son et al. | |
| 2016/0308794 A1 | 10/2016 | Kim et al. | |
| 2016/0352656 A1* | 12/2016 | Galley | G06N 3/0454 |
| 2018/0143760 A1* | 5/2018 | Orr | G06F 3/0233 |
| 2018/0150552 A1* | 5/2018 | Wang | G06F 16/3344 |

OTHER PUBLICATIONS

Chen, Xingxion et al. "A Unified Model for Word Sense Representation and Disambiguation", Proceedings of 2014 Conference on Empirical Methods in Natural Language Processing, pp. 1025-1035, 2014. (Year: 2014).*

Greg Corrado, "Computer, respond to this email." Nov. 3, 2015, https://ai.googleblog.eom/2015/11/computer-respond-to-this-email.html , pp. 1-4. (Year: 2015).*

United Kingdom Intellecutal Property Office; Examination Report issued in Application No. 1715741.3 dated Jan. 9, 2020.

European Patent Office—International Searching Authority; Notification of Transmittal of the International Search Report and the Written Opinion of PCT Serial No. PCT/US2017/053658; dated Dec. 7, 2017.

Kannan, Anjuli et al.; Smart Reply, Proceedings of the 22nd ACM SIGKDD International Conference on Knowledge Discovery and Data Mining, KDD; Patent 955-964; US; dated Aug. 13, 2016.

Shang, Lifeng et al.; Neural Responding Machine for Short-Text Conversation; Proceedigns of the 53rd Annual Meeting of the Association for Computational Linguistics and the 7th International Joint Conference on Natural Language Processing; 12 pages; US; dated Apr. 27, 2015.

Xie, Ruobing et al.; Neural Emoji Recommendation in Dialogue Systems; 8 pages; US; dated Dec. 14, 2016.

European Patent Office; International Preliminary Report on Patentability of PCT Ser. No. PCT/US2017/053658, 20 pages, dated Mar. 13, 2019.

United Kingdom Intellecutal Property Office; Examination Report issued in Application No. 1715741.3 dated Mar. 26, 2018.

European Patent Office; Written Opinion of the International Preliminary Examining Authority of PCT Ser. No. PCT/US2017/053658, 6 pages, dated Dec. 5, 2018.

Japanese Patent Office: Office Action issued in Application No. 2019-535787 dated Nov. 17, 2020.

Korean Patent Office; Office Action issued in Application No. 20197021484; 8 pages; dated Mar. 5, 2021.

* cited by examiner

| Candidate Response | Min. Similarity Score |
|---|---|
| Hope you feel better soon ! | (Initially Selected) |
| Hope you feel better soon . | (0.00) |
| I hope you feel better soon . | (1.24) |
| I hope you feel better soon ! | (0.00) |
| Feel better soon ! | (2.74) |
| I hope you feel better . | (2.39) |
| I hope you feel better ! | (0.00) |
| Get well soon ! | (2.95) |
| Hope you feel better ! | (1.50) |
| Get well soon . | (0.00) |
| Hope you feel better . | (0.00) |
| Thanks for letting me know . | (5.65) |
| Oh no ! Feel better ! | (3.16) |
| Thank you for letting me know . | (1.56) |
| I hope you get better soon . | (2.26) |
| Feel better . | (2.43) |
| I hope you get better soon ! | (0.00) |
| I hope you are feeling better soon . | (2.17) |
| What happened ? | (7.60) |
| Thank you for letting us know . | (1.70) |
| .... | |

FIG. 4

DETERMINING SEMANTICALLY DIVERSE RESPONSES FOR PROVIDING AS SUGGESTIONS FOR INCLUSION IN ELECTRONIC COMMUNICATIONS

BACKGROUND

Users are often inundated with electronic communications such as emails, SMS (short message service) communications, chat communications, social networking communications, etc. Many electronic communications that are sent to a user explicitly solicit a reply or otherwise contain information to which the user may wish to reply. For example, an email that contains "Are you interested in grabbing lunch?" may explicitly solicit a reply. An email that contains "I just got engaged!" may not explicitly solicit a reply, but a user that receives the email may still wish to send a congratulatory reply to the email. Users formulate replies to the electronic communications and input the formulated replies at client devices utilizing a keyboard (e.g., a virtual keyboard of a smartphone or tablet), a microphone, and/or other user interface input device(s) of the client device.

SUMMARY

In some situations it may be desirable to suggest one or more responses to a user for inclusion in a reply electronic communication that is a reply to an electronic communication transmitted to the user. For example, if a chat message of "Are you interested in grabbing lunch?" is transmitted to a client device of a user, it may be desirable to provide the user with responses that can be selected by the user, via the client device, (e.g., with a single-tap or other single-selection input) for inclusion in a reply chat message that is responsive to the received chat message. For instance, responses such as "Sure, what time?", "Thanks, but I'm busy", and "I'll get back to you" may be provided as suggestions based on their contextual relevance to the received chat message of "Are you interested in grabbing lunch?". Selection of one of the provided responses by the user will reduce the number of user inputs that a user must make to formulate the reply, which may reduce the usage of various client device computational resources and/or be of particular benefit to users that have low dexterity (or who otherwise have difficulties making user inputs to a client device).

However, some techniques for generating suggested responses may generate a large quantity of candidate responses that may potentially be provided as suggestions. Due to user interface constraints and/or other considerations, it may be undesirable and/or impossible to provide all such candidate responses for initial presentation to the user as suggestions. Accordingly, a subset of those candidate responses may be selected for initial presentation to the user as suggestions. Implementations disclosed herein seek to select such a subset in a manner that promotes semantic diversity among the responses of the subset.

In view of these and other considerations, some implementations of this specification are directed generally to methods and apparatus related to determining a semantically diverse subset of candidate responses to provide for initial presentation to a user as suggestions for inclusion in a reply to an electronic communication. Some of those implementations determine the semantically diverse subset of candidate responses based on generating, over a response encoder model, embeddings that are each based on one of the plurality of the candidate responses. The embedding based on a given candidate response may be compared to embedding(s) of candidate response(s) already selected for the subset, and the given candidate response added to the subset only if the comparing indicates a difference criterion is satisfied. For example, the difference criterion may be satisfaction of a threshold that indicates a sufficient degree of semantic difference between the given candidate response and already selected candidate response(s). As used herein, a "response encoder model" is a model that can be used to process a sequence of tokens (e.g., included in a response) to generate an embedding of that sequence. A token of a candidate response may be a textual token (e.g., a word, a phrase) included in the candidate response or a graphical token (e.g., a sticker or an emoji, such as a thumbs-up emoji or a smiley emoji) included in the candidate response. For example a candidate response of "Hope you feel better soon" includes textual tokens of "Hope", "you", "feel", "better", and "soon". Also, for example, a candidate response of "Can't wait ☺" includes textual tokens of "Can't" and "wait", and a graphical token of "☺". The embedding of a sequence of tokens of a candidate response is a dense representation (i.e., a real-valued vector) of the sequence of tokens. In various implementations, a response encoder model is a neural network model.

Determining and providing a semantically diverse subset of responses for initial presentation to a user as suggestions may increase the likelihood that one of the provided responses is sufficient to convey the essence of an intended response of the user. As a result, a likelihood that a user will select one of the provided responses for inclusion in a reply may be increased. As described above, selecting one of the provided responses will reduce the number of user inputs that a user must make to formulate the reply, which may reduce the usage of various client device computational resources and/or be of particular benefit to users that have low dexterity (or who otherwise have difficulties making user inputs to a client device).

In some implementations, a method implemented by one or more processors is provided and includes identifying a candidate set of responses for consideration for inclusion in a reply to a transmitted electronic communication directed to a user. Each of the responses of the candidate set include one or more tokens and is determined based on content of the electronic communication. The method further includes: selecting a first response, of the responses of the candidate set, for inclusion in a selected set; generating a first embedding over a neural network response encoder model based on applying the first response as input to the neural network response encoder model; and generating a second embedding over the neural network response encoder model based on applying a second response, of the responses of the candidate set, as input to the neural network response encoder model. The method further includes determining that the second response satisfies a difference criterion relative to the first response based on comparing the first embedding to the second embedding. The method further includes: based on determining that the second response satisfies the difference criterion, selecting the second response for inclusion in the selected set; and providing the responses of the selected set for display in an interface rendered by a client device of the user. The interface enables selection of any one of the responses of the selected set for inclusion in a reply electronic communication that is a reply by the user to the electronic communication.

This method and other implementations of technology disclosed herein may each optionally include one or more of the following features.

In some implementations, one or more of the processors are remote from the client device and providing the responses of the selected set for display in the interface includes transmitting content to the client device to cause the client device to visually render the responses of the selected set in the interface a selectable manner.

In some implementations, the method further includes receiving a selection of a given response of the responses of the selected set, and incorporating the response into the reply communication in response to receiving the selection. The selection may be based on user interface input generated by a user interface input device of the client device In some implementations, the neural network response encoder model includes long short-term memory cells. In some of those implementations, generating the first embedding includes using a state of one or more of the long short-term memory cells of the neural network response encoder model as the embedding, where the state is the state after applying the first response to the neural network response encoder model. In some of those implementations: generating the first embedding is further based on applying at least part of the electronic communication to the neural network response encoder model prior to applying the first response; and generating the second embedding is further based on applying at least part of the electronic communication to the neural network response encoder model prior to applying the second response to the neural network response encoder model.

In some implementations, determining that the second response satisfies the difference criterion relative to the first response based on comparing the first embedding to the second embedding includes: calculating a measure between the first embedding and the second embedding, and determining that the measure satisfies a threshold. In some of those implementations, the measure is a cosine similarity measure, a dot product, or a Euclidian distance.

In some implementations, the candidate set of responses are ranked and selecting the first response is based on it being the most highly ranked. In some of those implementations, the method further includes: identifying an additional response, of the responses of the candidate set, that is the next most highly ranked response following the first response; generating an additional embedding over the neural network response encoder model based on applying the additional response as input to the neural network response encoder model; determining that the additional response fails to satisfy the difference criterion relative to the first response based on comparing the first embedding and the additional embedding; and omitting the additional response from the selected set based on the second response failing to satisfy the difference criterion.

In some implementations, the method further includes, subsequent to selecting the second response for inclusion in the selected set: identifying an additional response of the responses of the candidate set; generating an additional embedding over the neural network response encoder model based on applying the additional response as input to the neural network response encoder model; determining that the additional response satisfies the difference criterion relative to at least one of: the first response and the second response; and selecting the additional response for inclusion in the selected set based on the second response satisfying the difference criterion relative to at least one of the first response and the second response. Determining that the additional response satisfies the difference criterion relative to at least one of the first response and the second response may be based on comparing the additional embedding to the first embedding and comparing the additional embedding to the second embedding. Determining that the additional response satisfies the difference criterion relative to at least one of the first response and the second response may include determining that the additional response satisfies the difference criterion relative to both the first response and the second response.

In some implementations, providing the responses of the selected set occurs independent of any input provided via the client device in generating the reply electronic communication.

In some implementations, a method implemented by one or more processors is provided and includes identifying a ranked candidate set of responses for consideration for inclusion in a reply to an electronic communication transmitted to a user. Each of the responses of the candidate set include one or more tokens and is determined based on content of the electronic communication. The method further includes, selecting a first response, of the responses of the candidate set, for inclusion in a selected set, based on it being the most highly ranked of the responses of the candidate set. The method further includes, for each of a plurality remaining responses of the responses of the candidate set, and until at least one condition has been satisfied: comparing an embedding vector of the remaining response to a first embedding vector of the first response and any embedding vectors of any additional responses selected for inclusion in the selected set, and determining whether to include the remaining response in the selected set based on the comparing. The method further includes providing the responses of the selected set for display in an interface rendered by a client device of the user. The interface enables selection of any one of the responses of the selected set for inclusion in a reply electronic communication that is a reply by the user to the electronic communication.

This method and other implementations of technology disclosed herein may each optionally include one or more of the following features.

In some implementations, the at least one condition includes that a threshold quantity of the responses have been selected for inclusion in the selected set.

In some implementations, one or more of the processors are remote from the client device and providing the responses of the selected set for display in the interface includes transmitting content to the client device to cause the client device to visually render the responses of the selected set in the interface a selectable manner.

In some implementations, the method further includes receiving a selection of a given response of the responses of the selected set, and incorporating the response into the reply communication in response to receiving the selection.

Other implementations may include one or more non-transitory computer readable storage media storing instructions executable by a processor to perform a method such as one or more of the methods described above. Yet another implementation may include a system including memory and one or more processors operable to execute instructions, stored in the memory, to perform a method such as one or more of the methods described above.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIG. 4 illustrates example responses and minimum similarity scores for those responses that may be determined according to implementations disclosed herein.

DETAILED DESCRIPTION

Figure 1:
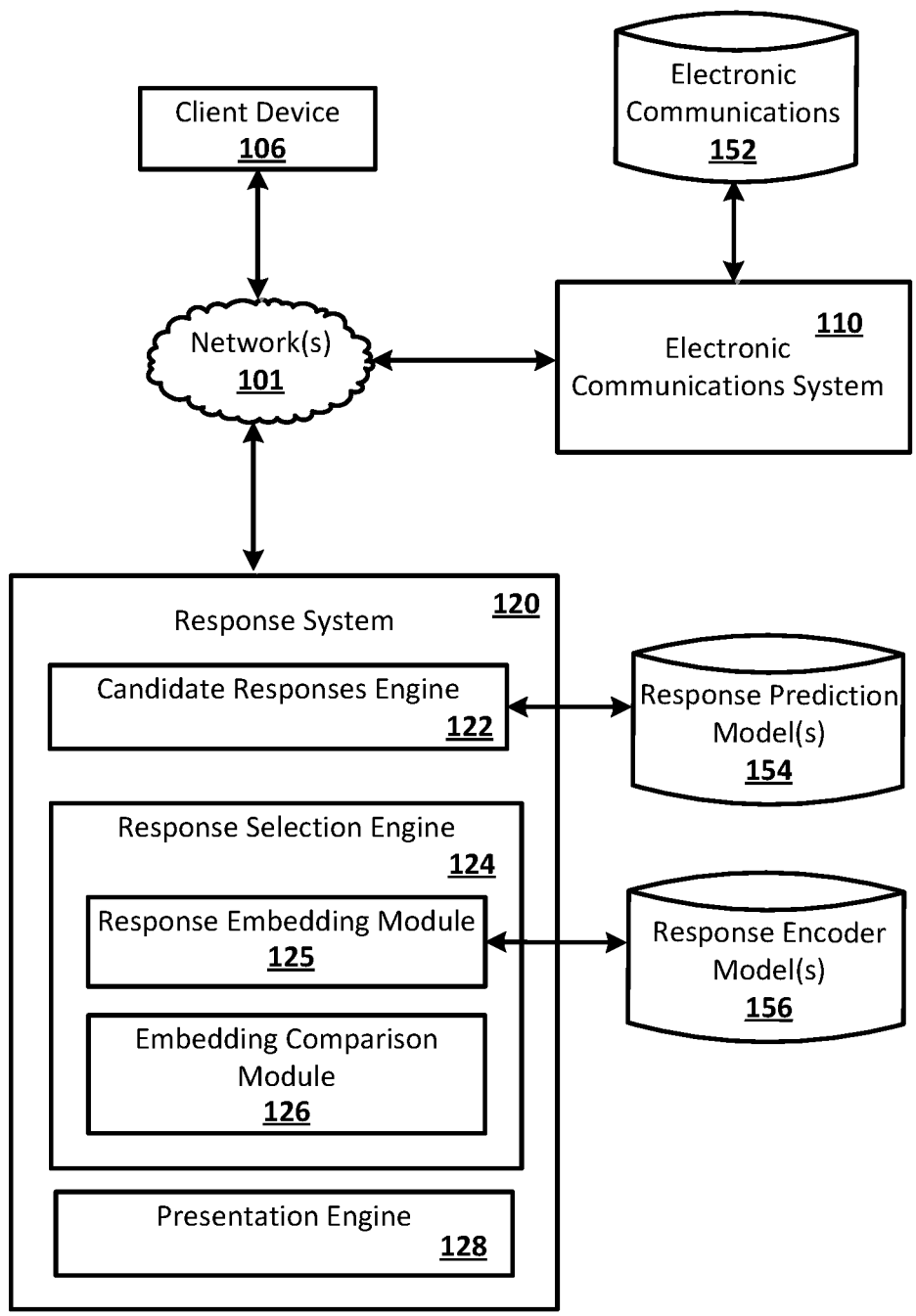
FIG. 1 illustrates an example environment in which a set of semantically diverse responses may be determined and provided as suggestions for inclusion in a reply electronic communication.

FIG. 1 illustrates an example environment in which a set of semantically diverse responses may be determined and provided as suggestions for inclusion in a reply electronic communication. The example environment includes a communication network 101 that facilitates communication between the various components in the environment. In some implementations, the communication network 101 may include a wide area network (WAN) such as the Internet, one or more intranets, and/or one or more bus subsystems. The communication network 101 may optionally utilize one or more standard communications technologies, protocols, and/or inter-process communication techniques.

The example environment of FIG. 1 also includes a client device 106, an electronic communications system 110, a response system 120, at least one electronic communications database 152, response prediction model(s) 154, and response encoder model(s) 156.

Electronic communications system 110 and response system 120 may each be implemented in one or more computing devices that communicate, for example, through a network (e.g., network 101 and/or other network). Electronic communications system 110 and response system 120 are example systems in which the systems, components, and techniques described herein may be implemented and/or with which systems, components, and techniques described herein may interface. Electronic communications system 110 and response system 120 each include one or more memories for storage of data and software applications, one or more processors for accessing data and executing applications, and other components that facilitate communication over a network. In some implementations, electronic communications system 110 and response system 120 may include one or more components of the example computing device of FIG. 6. The operations performed by electronic communications system 110 and response system 120 may be distributed across multiple computer systems. In some implementations, one or more aspects of electronic communications system 110 and response system 120 may be combined in a single system and/or one or more aspects may be implemented on the client device 106.

The electronic communications database 152 includes one or more storage mediums that include all, or portions of, electronic communications of a plurality of users. In some implementations, the electronic communications database 152 is maintained by the electronic communications system 110. For example, the electronic communications system 110 may include one or more email systems and the electronic communications database 152 may include a plurality of emails that are sent and/or received via the email systems. As another example, the electronic communications system 110 may include one or more social networking systems and the electronic communications database 152 may include a plurality of messages, posts, or other communications that are sent and/or received via the social networking systems.

As used herein, an "electronic communication" or "communication" may refer to an email, a text message (e.g., SMS, MMS), an instant message, a transcribed voicemail, or any other electronic communication that is sent from a first user to a restricted group of one or more additional users. In various implementations, an electronic communication may include various metadata and the metadata may optionally be utilized in one or more techniques described herein. For example, an electronic communication such as an email may include an electronic communication address such as one or more sender identifiers (e.g., sender email addresses), one or more recipient identifiers (e.g., recipient email addresses, including cc'd and bcc'd recipients), a date sent, one or more attachments, a subject, a type of device that sent and/or received the electronic communication, and so forth.

As used herein, "electronic communication" and "communication" will be utilized, depending on the context, to refer to both an electronic communication that includes only a single "initial" message and an electronic communication that includes an initial message and one or more additional messages that are subsequent to the initial message. For example, an electronic communication may include an "initial" message from a first user and an additional message that is a reply message from a second user. Also, for example, an electronic communication may include an "initial" message from a first user and an additional message that is also from the first user. Accordingly, candidate responses described herein may be generated based on a received communication that includes just a single initial message, or a received communication that includes the initial message and one or more additional messages. An electronic communication may be a single document such as an email that includes both an initial message and one or more additional messages, and that can optionally be processed to distinguish the original message and the additional message(s). Processing an electronic communication to distinguish an initial message and an additional message may include "splitting" the message based on presence of metadata, message breaks, header information included in the message, quotes provided around the initial message, etc. An electronic communication may also be multiple documents that are mapped to one another based on at least one of the multiple documents being responsive to other of the multiple documents. For example, an electronic communication may include a first email that is an original message received by a user and a second email sent by the user as a reply to that original message, or original and reply SMS messages. The mapping of multiple documents to one another may be performed, for example, by the electronic communications system 110. For example, the electronic communications system 110 may map a first email to a second email based on a user selecting a "reply" user interface element when viewing the first email and then drafting the second email responsive to selecting the reply user interface element.

Generally, response system 120 determines and provides suggested responses to include in a reply to an electronic communication, such as an electronic communication provided by client device 106 and/or an electronic communication of electronic communications database 152 to which a user has yet to reply. As described herein, the response system 120 may determine a candidate set of responses based on one or more message features of the electronic communication, and may select a subset of the responses of the candidate set for actually providing as suggestions to include in a reply. In some implementations, the response system 120 may provide the subset of the responses as suggestions independent of any textual input provided by the user in generating the reply to the communication and/or independent any other content (e.g., voice input, graphical elements) provided by the user in generating the reply to the communication.

In various implementations, response system 120 may include a candidate responses engine 122, a response selection engine 124, and a presentation engine 128. The response selection engine 124 may include a response embedding module 125 and an embedding comparison module 126. In some implementations, aspects of one or more of engines 122, 124, 128, and/or modules 125, 126 may be omitted, combined, and/or implemented in a component that is separate from response system 120, such as client device 106 and/or electronic communications system 110.

Description of the components of response system 120 is provided below with reference to an electronic communication of a user, such as an electronic communication provided by client device 106 and/or an electronic communication of electronic communications database 152 to which the user has yet to reply. Although a single electronic communication is referenced in the examples for clarity, it is understood that the response system 120 may determine suggested responses for additional electronic communications of the user and/or of additional users. For example, the response system 120 may manage determination of suggested responses for each of multiple client devices via different sessions and may manage multiple sessions in parallel. For instance, the response system 120 in some implementations may be implemented as a cloud-based service employing a cloud infrastructure, e.g., using a server farm or cluster of high performance computers running software suitable for handling high volumes of requests from multiple users. However, for the sake of simplicity, many examples herein are described with respect to a single client device 106 and a single electronic communication.

The candidate responses engine 122 generates a candidate set of responses based on a transmitted electronic communication directed to at least one user (i.e., based at least in part on the content of the electronic communication as that content was sent to the user). In some implementations, the candidate responses engine 122 generates the candidate set of responses based on application of features of the communication to one or more response prediction models 154.

In some of those implementations, the features include tokens (e.g., textual token(s) and/or graphical token(s)) from the communication and the candidate responses engine 122 applies the tokens to a long short-term memory (LSTM) neural network model of the response prediction models 154 to generate output indicative of candidate responses. The applied tokens from the communication may include all of the tokens, or one or more subsets of the tokens (e.g., first sentence and/or last sentence, body of the communication only, subject and body, all of the communication with stopwords omitted). The candidate responses engine 122 then uses the output to determine candidate responses. For example, the candidate responses engine 122 may apply the tokens as input to the LSTM neural network model on a sequential token by token basis to generate, over the model, one or more outputs that each indicate a probability distribution over words.

The candidate responses engine 122 utilizes the output(s) of the LSTM neural network model to determine a set of candidate responses and to assign scores to (or otherwise rank) the candidate responses. In some implementations, the candidate responses are identified from a whitelist of candidate responses, such as a curated list of common responses. In some implementations, one or more of the candidate responses may additionally or alternatively be generated in an unrestricted token by token manner (i.e., not identified from a whitelist of common responses). Regardless of the technique(s) utilized, the candidate responses engine 122 may identify a number of candidate responses (e.g., 10, 20, 30, or more) and may optionally rank the identified candidate responses based on, for example, scores assigned to the candidate response based on the output generated over the LSTM neural network model. The candidate responses engine 122 may communicate the candidate responses and the ranking to the response selection engine 124. The ranking of the candidate responses may be conveyed as scores for the candidate responses, an ordering of the candidate responses (e.g., a list where the first candidate response is the most highly ranked, the second candidate response is the next most highly ranked), etc. In some implementations, the candidate responses engine 122 may only identify up to X candidate responses and/or use thresholding to identify only candidate responses that have at least a threshold degree of conformance to the output generated over the LSTM neural network model.

In some implementations, the LSTM neural network model and/or other model of the one or more response prediction models 154 may be trained based on a large corpus of communications that include original messages and reply messages. For example, the neural network model may be trained to maximize the probability of features of observed reply messages given features of their respective original messages.

In some implementations, the candidate responses engine 122 may utilize additional and/or alternative techniques to generate a set of candidate responses. For example, the candidate responses engine 122 may utilize a response prediction model that is not an LSTM neural network model, may utilize feature(s) of a received electronic communication that are in addition to text of the electronic communication, etc. For example, the candidate response engine 122 may utilize features that are based on one or more natural language processing tags or other labels applied to text of the electronic communication (e.g., parts of speech, named entities, entity types, tone); features based on text that occurs specifically in the subjects, the first sentences, the last sentences, or other portion of the electronic communication; features based on metadata of the electronic communication such as a time the electronic communication was sent, day of the week the electronic communication was sent, a number of recipients, a type of device that sent the electronic communication, etc.

Regardless of technique(s) utilized, the candidate responses engine 122 provides the set of candidate responses to the response selection engine 124. In some implementations, the provided set of candidate responses are ranked. For example, they may be ordered based on the ranking and/or each include a score or other value that indicates its ranking. In some of those implementations, the response selection engine 124 selects the most highly ranked candidate response for inclusion in a selected set to provide to presentation engine 128 for presentation as suggested responses.

The response embedding module 125 utilizes one or more response encoder models 156 to generate an embedding based on the most highly ranked candidate response and an additional embedding for each of a plurality of additional considered candidate responses of the provided set of candidate responses. In some implementations, the response embedding module 125 generates the embeddings "live" (e.g., in response to receiving the candidate responses from the candidate responses engine 122). In some implementations, the response embedding module 125 may additionally or alternatively pre-generate one or more of the embeddings (e.g., pre-generate embeddings for each of a plurality of common candidate responses).

An embedding based on a response is a vector of values that are determined based on tokens of the response and that encode at least some of the semantics of the response. In some implementations, the embedding may be of the response and may be a transformation of the response into a vector of values that represent the semantics of the response. In some implementations, the embedding may be based on the response and also take into account context of an original communication for which a response is a candidate.

In some implementations, the response embedding module 125 utilizes a trained neural network model of the response encoder models 156 to generate an embedding based on a response. For example, the response embedding module 125 may apply the response as input to the neural network model and generate the embedding over the model based on the input. For instance, the embedding may be the final output of the model, or may be derived from the hidden state of the model.

As one example, the response embedding module 125 may generate an embedding of a response based on an LSTM neural network model. In some of those implementations, the LSTM neural network model may optionally be the same as that optionally utilized by the candidate responses engine 122 and described above. For example, the response embedding module 125 may apply the response sequentially on a token by token basis as input to the LSTM neural network model to generate a vector representation of the response in a hidden layer of the LSTM neural network model, and may utilize the vector representation of the response as the embedding of the response. As another example, the response embedding module 125 may additionally or alternatively utilize other neural network models that generate an embedding of a token (in hidden layer(s) or as end output), such as a GloVE embedding model and/or a Word2Vec embedding model.

As mentioned above, in some implementations the response embedding module 125 may optionally generate the embedding based on the response and also take into account context of a communication for which a response is a candidate. For example, the response embedding module 125 may initially apply tokens (e.g., all of the tokens or a subset) from the communication as input to the LSTM neural network model, then apply the response, and utilize the resulting vector representation in the hidden layer as the embedding of the response. This may effectively encode aspects of the communication in the embedding and result in an embedding that includes semantics of the response in view of the communication. For example, the embedding of "Got it!" can mean "I received it" or "understood" depending on the context of the original communication. By applying features of a given communication in conjunction with the response "Got it!", an embedding can be generated that more accurately conveys the semantics of the response in the context of the original message. For instance, the embedding of "Got it!" when first applying the original communication text of "Did you get my message?", may differ significantly from the embedding of "Got it!" when first applying the original communication text of "No, the meeting is tomorrow".

The embedding comparison module 126 compares the embedding of each considered candidate response to embedding(s) of candidate response(s) already selected for the subset, and adds the candidate response to the subset only if the comparing indicates a difference criterion is satisfied. For example, assume that only a highest ranked candidate response has so far been selected for inclusion in the subset. The embedding comparison module 126 may compare an embedding of a lower ranked candidate response to the embedding of the highest ranked candidate response and only select the lower ranked candidate response for inclusion in the subset if the comparison indicates at least a threshold degree of semantic difference between the two embeddings. For example, the embedding comparison module 126 may calculate a cosine similarity between the two embeddings, calculate a Euclidian distance between the two embeddings, and/or calculate a dot product of the two embeddings; and compare the cosine similarity, the Euclidian distance, and/or the dot product to a difference criterion threshold. If the difference criterion threshold is satisfied, the embedding comparison module 126 adds the lower ranked candidate response to the subset. Otherwise, the embedding comparison module 126 does not add the lower ranked candidate response to the subset.

The embedding comparison module 126 may repeat this process until a threshold quantity of candidate response are selected for the subset, no candidate responses remain for consideration, and/or other condition is satisfied. The response selection engine 122 then provides the selected subset of candidate responses to the presentation engine 128. Additional description of some implementations of the response selection engine 124 is provided below with respect to the method of FIG. 3.

The presentation engine 128 provides the selected subset of candidate responses for inclusion in a reply electronic communication that is a reply by the user to the electronic communication. For example, the presentation engine 128 may present one or more user interface indications (e.g., graphical, audible) of the responses of the selected subset and, when a user generating the reply selects one of the indications, the corresponding response may be automatically incorporated in the reply. The reply may then be automatically sent and/or sent in response to further user interface input of the user (optionally after the user has added additional content to the reply). Such automatic incorporation of a selected response into a reply message saves the user from manually entering the selected response, and saves a number of user interaction steps and corresponding input required to establish a reply message that includes the response.

In some implementations, the presentation engine 128 provides the responses independent of any input and/or other content provided via a computing device of the user in generating a reply to the electronic communication. In some of those implementations, the subset of the responses may be selected by the response selection engine 124 before the user has even viewed or otherwise consumed the communication. For example, the candidate responses engine 122 and the response selection engine 124 may process a communication in advance of viewing by the user, and presentation engine 128 may append or otherwise associate the selected responses with the electronic communication before it is even viewed by the user. Hence, if a user views or otherwise consumes the electronic communication, suggested responses to the electronic communication can be provided promptly without delay.

In some implementations where the electronic communication is provided to the response system 120 by the client device 106, the presentation engine 128 may provide the selected subset of responses to the client device 106 for presentation to the user as options for including in a reply. In some implementations where the electronic communication is provided to the response system 120 by the electronic communications system 110 via the electronic communications database 152, the presentation engine 128 may store an association of the selected subset of responses with the electronic communication in the electronic communications database 152 and/or other database. In some implementations, one or more (e.g., all) aspects of the presentation engine 128 may be implemented by the client device 106 and/or the electronic communications system 110.

The presentation engine 128 may also provide display prominence information with the selected subset of responses that indicates the prominence (e.g., position, size, color) with which those responses should be presented. Generally, a higher ranking for a particular response, the greater the prominence for that response. As one example, the optional ranking determined by the response embedding module 125 may be utilized to determine the ranking for the responses of the selected subset.

In some implementations, the presentation engine 128 provides only the selected subset of responses (or associated identifiers), and potentially prominence information, and the client device 106 and/or electronic communications system 110 may generate a display of the selected documents based on the provided data. In some implementations, the presentation engine 128 may additionally provide some or all of the data necessary to generate the display. In some of those implementations, any provided prominence information may be incorporated in the data that indicates how the display should be presented.

Figure 2:
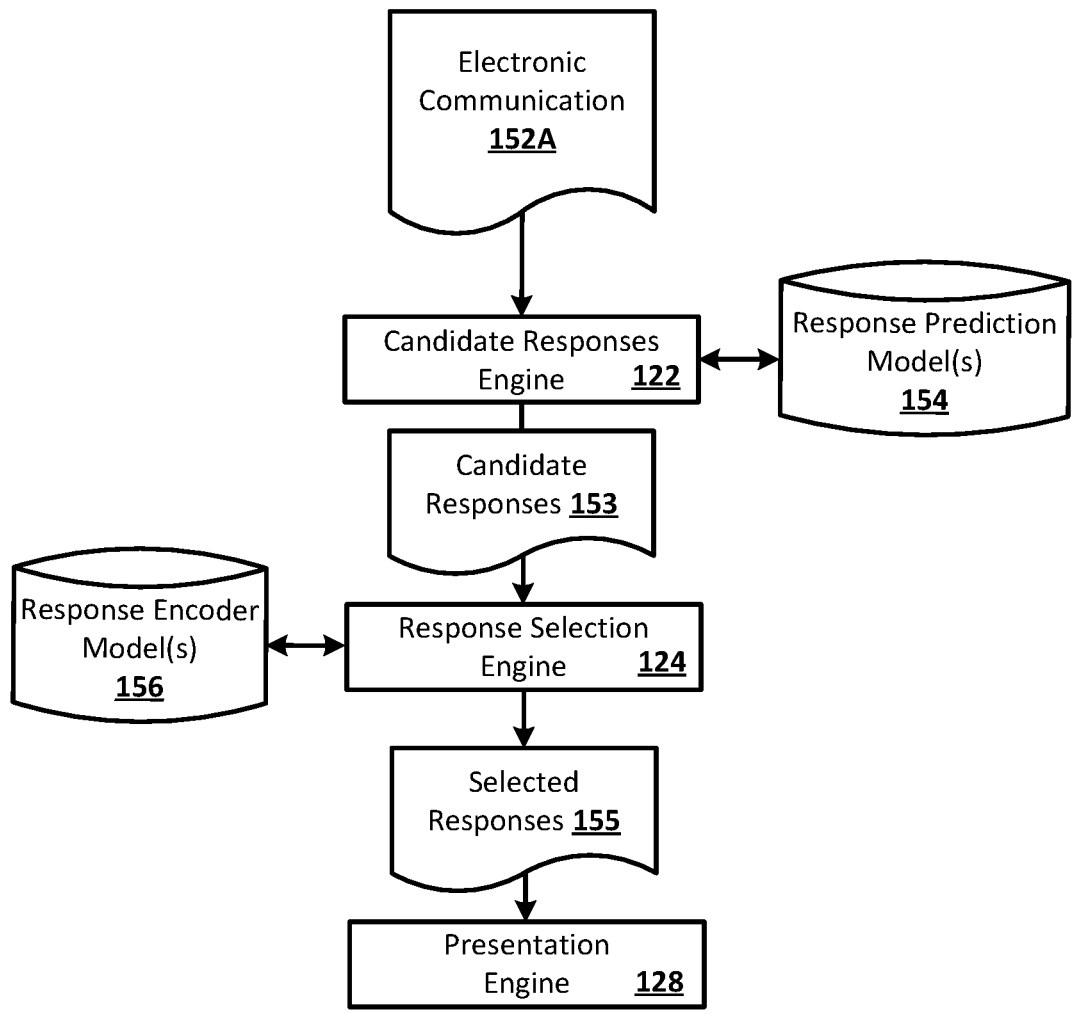
FIG. 2 illustrates an example of how candidate responses may be determined based on a received electronic communication, and a semantically diverse subset of those candidate responses selected for providing as suggestions for inclusion in a reply to the received electronic communication.

FIG. 2 illustrates an example of how candidate responses may be determined based on a received electronic communication, and a semantically diverse subset of those candidate responses selected for providing as suggestions for inclusion in a reply to the received electronic communication.

In FIG. 2, candidate responses engine 122 utilizes one or more response prediction model(s) 154 to determine a set of candidate responses 153. Electronic communication 152A may be provided by, for example, client device 106 or electronic communications system 110 of FIG. 1.

The candidate responses engine 122 provides the set of candidate responses 153 to response selection engine 124. The response selection engine 124 utilizes one or more response encoder models 156 to select a subset of the candidate responses 153 for presentation as suggestions in response to the electronic communication 152A. As described herein, the response selection engine 124 may utilize the response encoder model(s) 156 to generate embeddings of the candidate responses of the set of candidate responses 153, and may use the embeddings to select a semantically diverse subset of the set of candidate responses 153. The response selection engine 124 provides the selected responses 155 to the presentation engine 128.

The presentation engine 128 provides the selected response 155 for inclusion in a reply electronic communication that is a reply to the electronic communication 152A.

Figure 3:
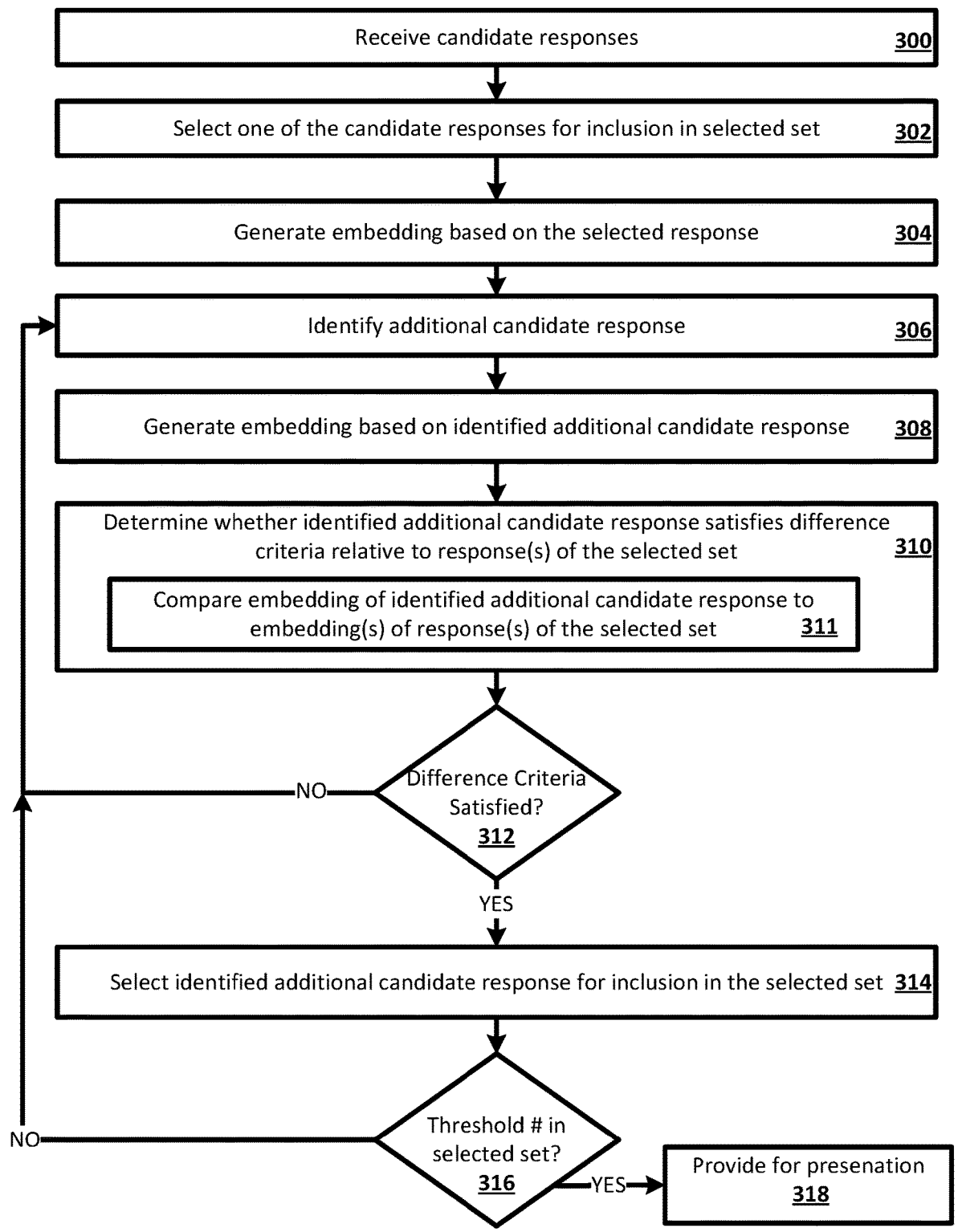
FIG. 3 is a flow chart illustrating an example method according to implementations disclosed herein.

FIG. 3 is a flow chart illustrating an example method according to implementations disclosed herein. For convenience, the operations of the flow chart are described with reference to a system that performs the operations. This system may include various components of various computer systems. For instance, some operations may be performed by the response selection engine 124. Moreover, while operations of the method of FIG. 3 are shown in a particular order, this is not meant to be limiting. One or more operations may be reordered, omitted or added.

At block 300, the system receives candidate responses for consideration in a reply to an electronic communication. For example, the system may receive the candidate response from a candidate responses engine that generates the candidate response based on features of the electronic communication, such that the candidate response are contextually relevant to the electronic communication.

At block 302, the system selects one of the candidate responses for inclusion in a selected set. For example, the candidate responses received at block 300 may be ranked and the system may select the most highly ranked candidate response for inclusion in the selected set.

At block 304, the system generates an embedding based on the selected response of block 302. For example, the system may generate the embedding over a neural network response encoder model based on applying the selected response as input to the neural network response encoder model. Various response encoder models may be utilized, such as an LSTM neural network model. Further, the embedding may be generated as "end" output of the model, or may be generated based on part of the model's hidden state (e.g., based on the LSTM's state after application of the response). In some implementations, at block 304 the system generates the embedding based on the selected response of block 302 and based on one or more features of the electronic communication for which the candidate responses were generated. This may effectively encode aspects of the electronic communication in the embedding and result in an embedding that includes semantics of the selected response in view of the electronic communication.

At block 306, the system identifies an additional candidate response of the candidate responses received at block 300. For example, the candidate responses received at block 300 may be ranked and the system may identify the next most highly ranked candidate response.

At block 308, the system generates an embedding based on the identified additional response of block 306. For example, the system may generate the embedding over the neural network response encoder model used at block 304 based on applying the identified additional response as input to the neural network response encoder model. In some implementations, at block 308 the system generates the embedding based on the identified additional response of block 306 and based on one or more features of the electronic communication for which the candidate responses were generated. This may effectively encode aspects of the electronic communication in the embedding and result in an embedding that includes semantics of the identified additional response in view of the electronic communication.

At block 310, the system determines whether the identified additional response of block 306 satisfies one or more difference criterion relative to response(s) included in the selected set. At one or more initial iterations of block 310, this involves determining whether the identified additional response satisfies the difference criterion relative to the selected candidate response of block 302. After additional candidate response(s) have been included in the selected set at block 314 (described below), block 310 may involve determining whether the identified additional response satisfies the difference criterion relative to: the selected candidate response of block 302; and additional candidate response(s) included in the selected set 314 at one or more iterations of block 314.

Block 310 may include block 311, where the system compares the embedding of the identified additional response of block 306 to the embedding(s) of the response(s) of the selected set. At one or more initial iterations of block 311, this involves comparing the embedding of the identified additional response to the embedding of the selected candidate response of block 302. After additional candidate response(s) have been included in the selected set at block 314 (described below), block 311 may involve comparing the embedding of the identified additional response to: the embedding of the selected candidate response of block 302; and additional embedding(s) of candidate response(s) included in the selected set 314 at one or more iterations of block 314. In some implementations, in comparing two embeddings, the system calculates a cosine similarity between the two embeddings, calculates a Euclidian distance between the two embeddings, and/or calculates a dot product of the two embeddings.

When block 310 includes block 311, determining whether the difference criterion is satisfied may be based on the comparison of block 311. For example, cosine similarity measure(s) between the embedding of the identified additional candidate response and the response(s) of the selected set may each be compared to a difference criterion threshold. If each of the cosine similarity measures satisfies the difference criterion threshold, it may be determined that the identified additional candidate response satisfies the difference criterion. Otherwise, it may be determined that the identified additional candidate response does not satisfy the difference criterion (i.e., if any of the cosine similarity measures fails to satisfy the difference criterion threshold).

At block 312, the system determines whether the difference criterion was satisfied at a most recent iteration of block 310. If not, the system proceeds back to block 306, identifies yet another additional candidate response, and performs blocks 308 and 310 based on that identified additional candidate response.

If, at block 312, the system determines the difference criterion was satisfied, the system proceeds to block 314. At block 314, the identified additional candidate response is selected for inclusion in the selected set. The system then proceed to block 316.

At block 316, the system determines whether a threshold number of responses have been selected for inclusion in the selected set. Various threshold numbers may be utilized and may optionally be based on characteristics of a client device to which the responses are to be provided as suggestions. For example, for a mobile phone client device the threshold number may be three, whereas for a desktop client device the threshold number may be five.

If, at block 316, the system determines the threshold number of responses have been selected, the system proceeds to block 318 and provides the selected responses for presentation (e.g., audibly and/or for display in a graphical interface) as suggestions for inclusion in a reply electronic communication that is a reply to the electronic communication for which the candidate responses of block 300 were generated. Block 318 may include providing the selected responses immediately for presentation on the client device, or may include storing the responses in association with the electronic communication for subsequently providing (e.g., providing in response to the user initially viewing or otherwise initially consuming the electronic communication). In some implementations, the system may proceed to block 318 in response to other conditions being satisfied, where those other conditions are in addition to or an alternative to the condition of block 316. For example, the system may proceed to block 318 in response to determining that no candidate responses are left to process, in response to determining that a threshold number of candidate responses have been processed, and/or in response to a timeout condition.

If, at block 316, the system determines the threshold number of responses have not been selected, the system proceeds back to block 306, identifies yet another additional candidate response, and performs blocks 308 and 310 based on that identified additional candidate response.

One non-limiting example of the method of FIG. 3 is provided with reference to FIG. 4. The partial list of candidate responses displayed in the left column of FIG. 4 may be those received at block 300 and may be generated as candidate responses for an electronic communication of "I'm sick and can't make it". Further, the list of FIG. 4 may be received with a ranking that is indicated by the order in which they appear in FIG. 4 (i.e., "Hope you feel better soon !" is the most highly ranked, followed by "Hope you feel better soon.", and so forth).

At block 302, the system may select "Hope you feel better soon !" based on it being the most highly ranked. The selection is indicated in FIG. 4 by "Hope you feel better soon !" being bolded. At block 304, the system generates an embedding based on "Hope you feel better soon !". At an initial iteration of block 306, the system selects "Hope you feel better soon." based on it being the next most highly ranked. At an initial iteration of block 308, the system generates an embedding based on "Hope you feel better soon." At block 311 of block 310, the system generates a cosine similarity measure of "0.00" based on comparing the two embeddings. The cosine similarity measure of "0.00" indicates the two embeddings are semantically the same (e.g., the punctuation marks "." and "?" may have been ignored in generating the embeddings). At block 310, the system may further compare the measure of "0.00" to a difference criterion threshold (e.g., 3.50) and determine that the difference criterion threshold is not satisfied.

Based on the difference criterion not being satisfied, the system at block 312 proceeds back to block 306. At this next iteration of block 306, the system selects "I hope you feel better soon." based on it being the next most highly ranked. At the next iteration of block 308, the system generates an embedding based on "I hope you feel better soon." At block 311 of block 310, the system generates a cosine similarity measure of "1.24" based on comparing the two embeddings. The cosine similarity measure of "1.24" indicates the degree of semantic similarity between the two embeddings. At block 310, the system may further compare the measure of "1.24" to a difference criterion threshold (e.g., 3.50) and determine that the difference criterion threshold is not satisfied. Based on the difference criterion not being satisfied, the system at block 312 proceeds back to block 306.

The system continues with iterations of blocks 306, 308, 310, and 312 until the candidate response of "Thanks for letting me know." is considered. As indicated by the similarity score "5.65" illustrated for that candidate response in FIG. 4 (and the bolding of that candidate response in FIG. 4), it satisfies the threshold. Accordingly, at the iteration of block 312 where that candidate response is being considered, the system proceed to block 314 and adds "Thanks for letting me know." to the selected set. The system then proceeds to block 316. At block 316, the threshold number may be three and, as a result, the system may proceed to another iteration of block 306 and select "Oh no ! Feel better !". based on it being the next most highly ranked. At this iteration of block 308, the system generates an embedding based on "Oh no ! Feel better !". At block 311 of block 310, the system generates a cosine similarity measure of "3.16". The generated cosine similarity measure of "3.16" illustrated in FIG. 4 is the minimum of two separate cosine similarity measures generated. In particular, a first cosine similarity measure may be generated based on comparing the embedding for "Oh no ! Feel better !" to the embedding for "Hope you feel better soon !"; and a second cosine similarity measure may be generated based on comparing the embedding for "Oh no ! Feel better !" to the embedding for "Thanks for letting me know." (since it now also forms part of the selected set). At block 310, the system may further compare the measure of "3.16" to a difference criterion threshold (e.g., 3.50) and determine that the difference criterion threshold is not satisfied. Based on the difference criterion not being satisfied, the system at block 312 proceeds back to block 306.

The system continues with further iterations of blocks 306, 308, 310, and 312 until the candidate response of "What happened?" is considered. As indicated by the similarity score "7.60" illustrated for that candidate response in FIG. 4 (and the bolding of that candidate response in FIG. 4), it satisfies the threshold. Accordingly, it may be selected for inclusion in the set at a corresponding iteration of block 314. Further, where the threshold number of block 316 is three, the method of FIG. 3 may, at a corresponding iteration of block 316, proceed to block 318 (and not process the subsequent candidate response of "Thank you for letting us know." and other subsequent candidate responses indicated by the ellipsis of FIG. 4).

It is noted that in some implementations, the generation of one or more embeddings (e.g., at block 304 and/or one or more iterations of block 308) may be "pre-calculated" and those pre-calculated embeddings utilized at those iterations instead of calculating an embedding "live".

Figure 5A:
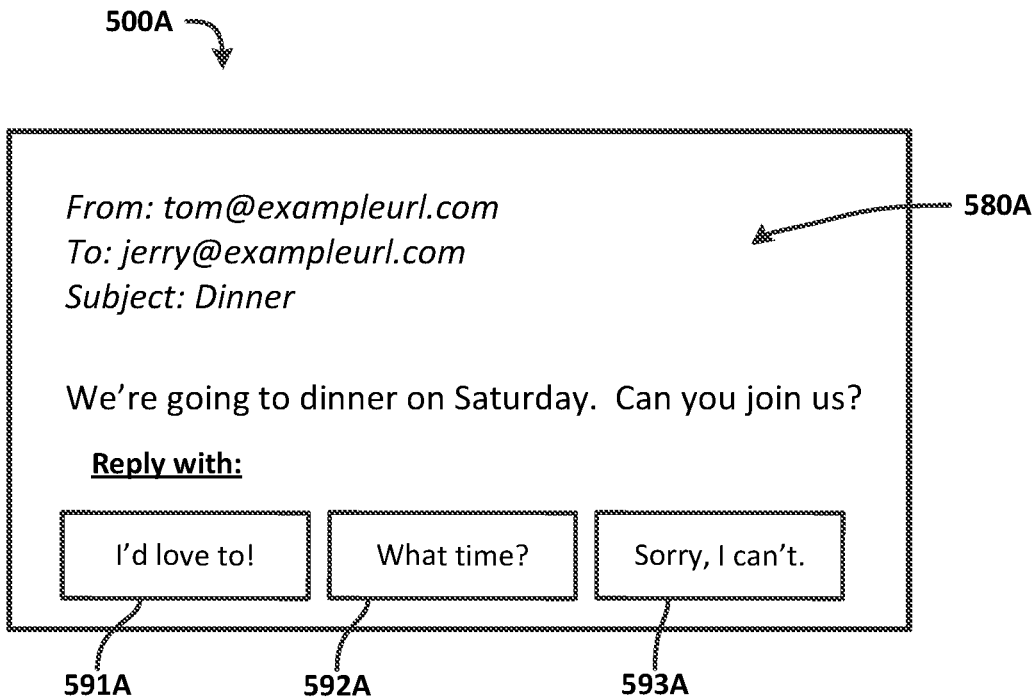
FIG. 5A and FIG. 5B each illustrate example graphical user interfaces for providing a semantically diverse subset of candidate responses as suggestion for inclusion in a reply to a received electronic communication.
Figure 5B:
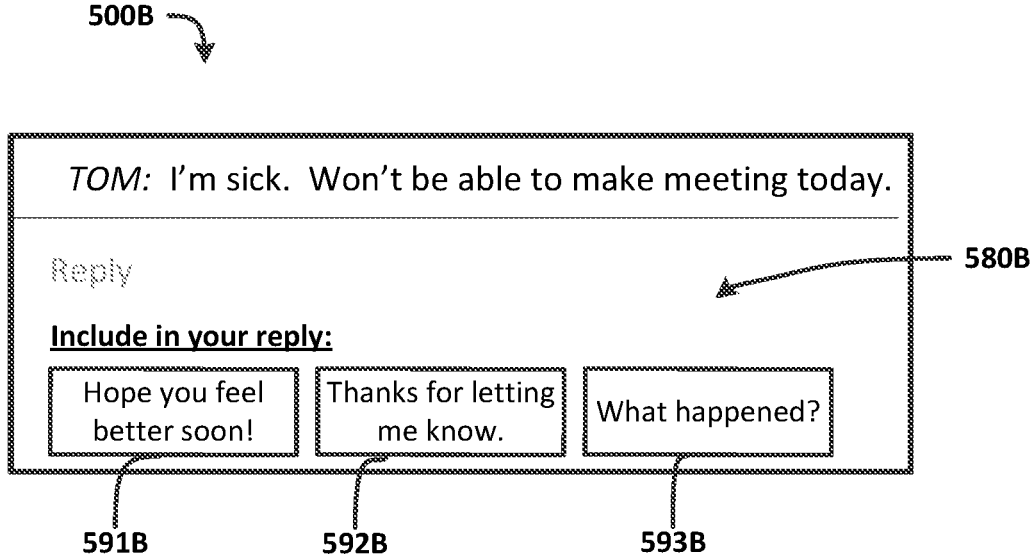

FIG. 5A and FIG. 5B each illustrate example graphical user interfaces 500A and 500B for providing a semantically diverse subset of candidate responses as suggestion for inclusion in a reply to a received electronic communication. The graphical user interfaces 500A and 500B may be presented at client device 106 (e.g., in a browser executing at client device 106 and/or in a dedicated electronic communication application executing at client device 106).

In FIG. 5A, an original email 580A that has been sent to a user is being viewed by the user, before the user has provided any user interface input to indicate a desire to reply to the original email 580A. Selected responses 591A, 592A, and 593A are presented in the graphical user interface 500A and are presented for inclusion in a reply to the email. For example, a user selection of response 591A may automatically present an editable reply email to the user that includes the text "I'd love to!" automatically incorporated in the reply email—or may automatically generate and send such a reply email (without first presenting an editable version to the user). The user selection of a response may be a single user interface input such as a single "tap", a single "mouse click", etc. It is noted that in FIG. 5A, the presented responses are all semantically diverse from one another and may be selected according to techniques described herein.

In FIG. 5B, an original chat message 580B that has been sent to a user is being viewed by the user, before the user has provided any content for inclusion in a reply to the original chat message 580B (e.g., possibly after the user has selected a "reply" interface element, but before the user has "typed" anything for the reply). Selected responses 591B, 592B, and 593B are presented in the graphical user interface 500B and are presented for inclusion in a reply to the original chat message 580B. For example, a user selection of response 593B may automatically present an editable reply chat message to the user that includes the text "What happened?" automatically incorporated in the reply—or may automatically generate and send such a reply chat message (without first presenting an editable version to the user). It is noted that in FIG. 5B, the presented responses are all semantically diverse from one another and may be selected according to techniques described herein.

Although examples of graphical interfaces are presented in FIGS. 5A and 5B, it is understood that responses may additionally or alternatively be provided for presentation to a user audibly via a client device. For example, the client device 106 may audibly "read" a received electronic communication, then audibly provide "Speak A to respond with I'd love to, B to respond with what time, C to respond with sorry, I can't". In response to spoken user interface input of A, B, or C during or after the audible providing, the client device 106 may then cause a corresponding reply to be generated and sent.

In situations in which the systems described herein collect personal information about users, or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

Figure 6:
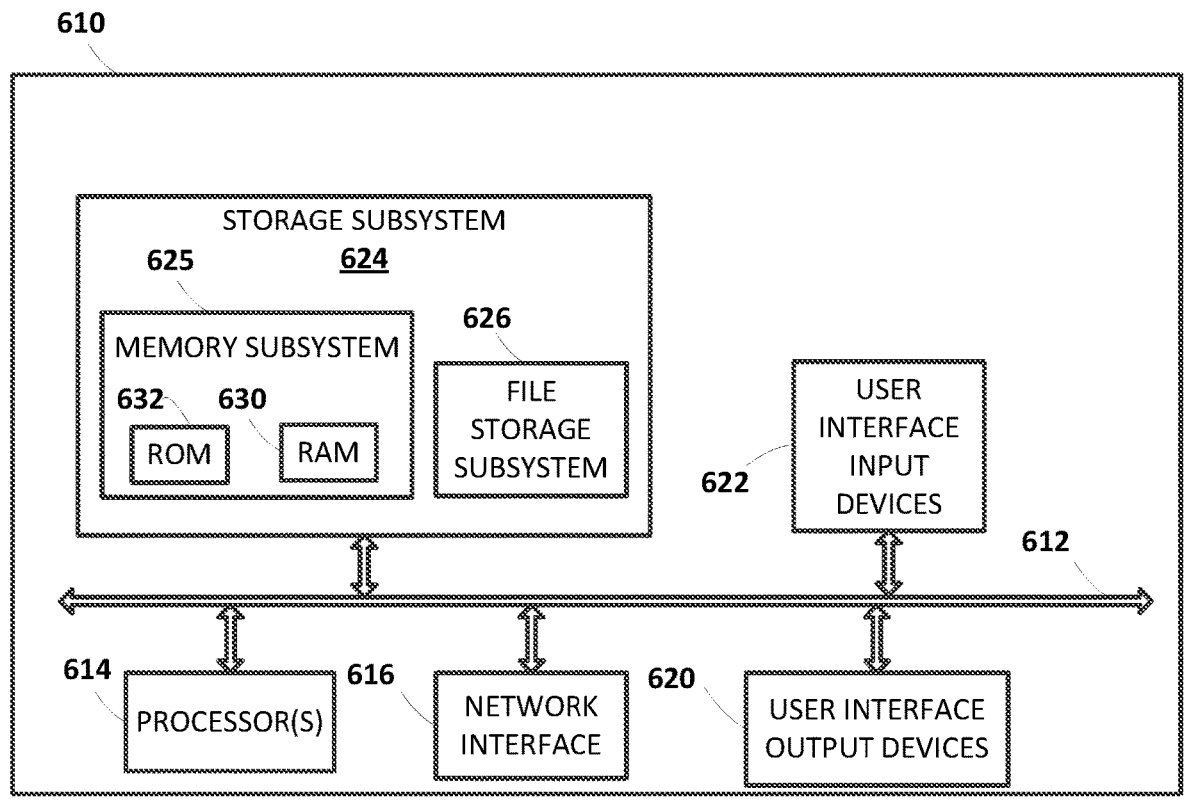
FIG. 6 illustrates an example architecture of a computing device.

FIG. 6 is a block diagram of an example computing device 610. Computing device 610 typically includes at least one processor 614 which communicates with a number of peripheral devices via bus subsystem 612. These peripheral devices may include a storage subsystem 624, including, for example, a memory subsystem 625 and a file storage subsystem 626, user interface output devices 620, user interface input devices 622, and a network interface subsystem 616. The input and output devices allow user interaction with computing device 610. Network interface subsystem 616 provides an interface to outside networks and is coupled to corresponding interface devices in other computing devices.

User interface input devices 622 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 610 or onto a communication network.

User interface output device 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 610 to the user or to another machine or computing device.

Storage subsystem 624 stores programming and data constructs that provide the functionality of some or all of the modules described herein. For example, the storage subsystem 624 may include the logic to perform selected aspects of the method of FIG. 3.

These software modules are generally executed by processor 617 alone or in combination with other processors. Memory 625 used in the storage subsystem can include a number of memories including a main random access memory (RAM) 630 for storage of instructions and data during program execution and a read only memory (ROM) 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 626 in the storage subsystem 627, or in other machines accessible by the processor(s) 617.

Bus subsystem 612 provides a mechanism for letting the various components and subsystems of computing device 610 communicate with each other as intended. Although bus subsystem 612 is shown schematically as a single bus, alternative implementations of the bus subsystem may use multiple busses.

Computing device 610 can be of varying types including a workstation, server, computing cluster, blade server, server farm, or any other data processing system or computing device. Due to the ever-changing nature of computers and networks, the description of computing device 610 depicted in FIG. 6 is intended only as a specific example for purposes of illustrating some implementations. Many other configurations of computing device 610 are possible having more or fewer components than the computing device depicted in FIG. 6.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented by one or more processors, comprising:
    identifying a candidate set of responses for consideration for inclusion in a reply to a transmitted electronic communication directed to a user,
        each of the responses of the candidate set including one or more tokens and being determined based on content of the electronic communication;
    selecting a first response, of the responses of the candidate set, for inclusion in a selected set;
    generating a first embedding over a neural network response encoder model based on applying the first response as input to the neural network response encoder model, the first embedding encoding semantic information of the first response;
    generating a second embedding over the neural network response encoder model based on applying a second response, of the responses of the candidate set, as input to the neural network response encoder model, the second embedding encoding semantic information of the second response;
    subsequent to generating the first embedding and the second embedding:
        calculating a measure between the first embedding and the second embedding;
        determining, based on the measure, whether the second response satisfies a difference criterion relative to the first response;
        in response to determining that the second response satisfies the difference criterion, selecting the second response for inclusion in the selected set; and
        providing the responses of the selected set for display in an interface rendered by a client device of the user, the interface enabling selection of any one of the responses of the selected set for inclusion in a reply electronic communication that is a reply by the user to the electronic communication.

2. The method of claim 1, wherein one or more of the processors are remote from the client device and wherein providing the responses of the selected set for display in the interface comprises:
    transmitting content to the client device to cause the client device to visually render the responses of the selected set in the interface a selectable manner.

3. The method of claim 1, further comprising:
    receiving a selection of a given response of the responses of the selected set, the selection based on user interface input generated by a user interface input device of the client device; and incorporating the response into the reply communication in response to receiving the selection.

4. The method of claim 1, wherein the neural network response encoder model includes long short-term memory cells.

5. The method of claim 4, wherein generating the first embedding comprises using a state of one or more of the long short-term memory cells of the neural network response encoder model as the embedding, the state being the state after applying the first response to the neural network response encoder model.

6. The method of claim 4, wherein generating the first embedding is further based on applying at least part of the electronic communication to the neural network response encoder model prior to applying the first response; and wherein generating the second embedding is further based on applying at least part of the electronic communication to the neural network response encoder model prior to applying the second response to the neural network response encoder model.

7. The method of claim 1,
wherein the measure is a cosine similarity measure, a dot product, or a Euclidian distance; and
wherein determining, based on the measure, whether the second response satisfies a difference criterion relative to the first response, comprises determining whether the measure satisfies a threshold.

8. The method of claim 1, wherein the candidate set of responses are ranked and wherein selecting the first response comprises selecting the first response based on it being the most highly ranked.

9. The method of claim 8, further comprising:
identifying an additional response, of the responses of the candidate set, that is the next most highly ranked response following the first response;
generating an additional embedding over the neural network response encoder model based on applying the additional response as input to the neural network response encoder model;
determining that the additional response fails to satisfy the difference criterion relative to the first response based on comparing the first embedding and the additional embedding; and
omitting the additional response from the selected set based on the second response failing to satisfy the difference criterion.

10. The method of claim 1, further comprising:
subsequent to selecting the second response for inclusion in the selected set:
identifying an additional response of the responses of the candidate set;
generating an additional embedding over the neural network response encoder model based on applying the additional response as input to the neural network response encoder model;
determining that the additional response satisfies the difference criterion relative to at least one of: the first response and the second response, the determining based on comparing the additional embedding to the first embedding and comparing the additional embedding to the second embedding; and
selecting the additional response for inclusion in the selected set based on the second response satisfying the difference criterion relative to one or both of the first response and the second response.

11. The computer-implemented method of claim 1, wherein providing the responses of the selected set occurs independent of any input provided via the client device in generating the reply electronic communication.

12. A method implemented by one or more processors, comprising:
identifying a ranked candidate set of responses for consideration for inclusion in a reply to an electronic communication transmitted to a user,
each of the responses of the candidate set including one or more tokens and being determined based on content of the electronic communication;
selecting a first response, of the responses of the candidate set, for inclusion in a selected set, the selecting of the first response based on it being the most highly ranked of the responses of the candidate set;
for each of a plurality remaining responses of the responses of the candidate set, and until at least one condition has been satisfied:
comparing an embedding vector of the remaining response to a first embedding vector of the first response and any embedding vectors of any additional responses selected for inclusion in the selected set, the first embedding vector including semantic information of the first response, and the embedding vectors each including semantic information of a corresponding one of the additional responses, and
determining whether to include the remaining response in the selected set based on the comparing; and
in response to the at least one condition being satisfied, providing the responses of the selected set for display in an interface rendered by a client device of the user, the interface enabling selection of any one of the responses of the selected set for inclusion in a reply electronic communication that is a reply by the user to the electronic communication.

13. The method of claim 12, wherein the at least one condition includes that a threshold quantity of the responses have been selected for inclusion in the selected set.

14. The method of claim 12, wherein one or more of the processors are remote from the client device and wherein providing the responses of the selected set for display in the interface comprises:
transmitting content to the client device to cause the client device to visually render the responses of the selected set in the interface a selectable manner.

15. The method of claim 12, further comprising:
receiving a selection of a given response of the responses of the selected set, the selection based on user interface input generated by a user interface input device of the client device; and
incorporating the response into the reply communication in response to receiving the selection.

16. A system, comprising:
one or more processors;
memory coupled to the one or more processors;
wherein the one or more processors are operable to execute instructions stored in the memory to:
identify a candidate set of responses for consideration for inclusion in a reply to a transmitted electronic communication directed to a user,
each of the responses of the candidate set including one or more tokens and being determined based on content of the electronic communication;
select a first response, of the response of the candidate set, for inclusion in a selected set;
generate a first embedding over a neural network response encoder model based on applying the first response as input to the neural network response encoder model, the first embedding encoding semantic information of the first response;
generate a second embedding over the neural network response encoder model based on applying a second response, of the responses of the candidate set, as input to the neural network response encoder model, the second embedding encoding semantic information of the second response;
subsequent to generating the first embedding and the second embedding:
   calculate a measure between the first embedding and the second embedding;
determine, based on the measure, whether the second response satisfies a difference criterion relative to the first response;
in response to determining that the second response satisfies the difference criterion, select the second response for inclusion in the selected set; and
provide the responses of the selected set for display in an interface rendered by a client device of the user, the interface enabling selection of any one of the responses of the selected set for inclusion in a reply electronic communication that is a reply by the user to the electronic communication.

* * * * *